(12) United States Patent
Ye et al.

(10) Patent No.: US 8,971,253 B2
(45) Date of Patent: Mar. 3, 2015

(54) UPLINK DATA SENDING METHOD AND USER EQUIPMENT

(71) Applicant: Huawei Technologies Co., Ltd., Shenzhen (CN)

(72) Inventors: Chaoling Ye, Beijing (CN); Lei Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 13/761,952

(22) Filed: Feb. 7, 2013

(65) Prior Publication Data

US 2014/0056219 A1    Feb. 27, 2014

(30) Foreign Application Priority Data

Apr. 18, 2012 (CN) .......................... 2012 1 0114157

(51) Int. Cl.
*H04L 29/06* (2006.01)
(52) U.S. Cl.
CPC ...................................... *H04L 69/16* (2013.01)
USPC ........... 370/328; 370/329; 370/252; 370/230; 370/235
(58) Field of Classification Search
CPC ....... H04L 69/16; H04L 29/06; H04L 69/163; H04L 69/161; H04L 47/10; H04L 47/193
USPC .......................... 370/328, 329, 252, 230, 235
See application file for complete search history.

(56) References Cited

U.S. PATENT DOCUMENTS

| 2002/0095519 A1 | 7/2002 | Philbrick et al. |
| 2003/0031203 A1 | 2/2003 | Fukui |
| 2008/0080464 A1* | 4/2008 | Speight .................. 370/342 |

FOREIGN PATENT DOCUMENTS

| CN | 1416659 A | 5/2003 |
| CN | 1842052 A | 10/2006 |
| CN | 102136895 A | 7/2011 |

\* cited by examiner

*Primary Examiner* — Jamal Javaid
(74) *Attorney, Agent, or Firm* — Brinks Gilson & Lione

(57) ABSTRACT

The present invention provides an uplink data sending method and a user equipment. The method includes: distinguishing uplink data to be sent, and obtaining acknowledgement data of downlink TCP service data and uplink TCP service data; buffering the acknowledgement data of the downlink TCP service data in a first buffer, and buffering the uplink TCP service data in a second buffer; and sending in priority the acknowledgement data of the downlink TCP service data in the first buffer. In embodiments of the present invention, a peak rate of a downlink TCP service may still be ensured when services are concurrent.

8 Claims, 5 Drawing Sheets

UPLINK DATA SENDING METHOD AND USER EQUIPMENT

CROSS-REFERENCE TO RELATED APPLICATIONS

This application claims priority to Chinese Patent Application No. 201210114157.8, filed on Apr. 18, 2012. which is hereby incorporated by reference in its entirety.

TECHNICAL FIELD

The present invention relates to radio communications technologies, and in particular, to an uplink data sending method and a user equipment.

BACKGROUND

A transmission control protocol (Transmission Control Protocol, TCP) layer is located at a transport layer of a TCP/IP protocol stack, and provides a reliable connection-oriented full-duplex transmission service for an application layer. The TCP adopts a traffic control method based on a sliding window protocol, and may dynamically adjust a rate according to a current network condition congestion condition. After a TCP connection is established, its rate is in inverse proportion to a delay, namely, the greater the delay is, the smaller the rate is; and the smaller the delay is, the greater the rate is.

Long term evolution (Long Term Evolution, LTE) is an evolution direction of 3G, improves and enhances an air access technology of the 3G, may provide a higher peak rate, and can provide a downlink peak rate of 100 Mbps and an uplink peak rate of 50 Mbps in a 20M spectral bandwidth.

When the LTE is used to perform a TCP service, a single-downlink TCP service may reach the downlink peak rate of 100 Mbps, and a single-uplink TCP service may also reach the uplink peak rate of 50 Mbps. However, when concurrent TCP uplink and downlink services are performed in an LTE single-bearer, because acknowledgement data (ACK) of downlink TCP service data and uplink TCP service data need to be sent at an LTE uplink direction at the same time, the uplink TCP service data may block sending of the acknowledgement data, so that a delay of the downlink TCP service is increased, and downlink TCP service traffic is caused to decrease and the peak rate cannot be reached, and air interface resources are wasted seriously.

SUMMARY

Embodiments of the present invention provide an uplink data sending method and a user equipment, which are used to ensure that a transmission rate of downlink data can reach a peak rate when TCP uplink and downlink are concurrent in an LTE single-bearer.

An embodiment of the present invention provides an uplink data sending method, including:
  distinguishing uplink data to be sent, and obtaining acknowledgement data of downlink transmission control protocol TCP service data and uplink TCP service data;
  buffering the acknowledgement data of the downlink TCP service data in a first buffer, and buffering the uplink TCP service data in a second buffer; and
  sending in priority the acknowledgement data of the downlink TCP service data in the first buffer.

An embodiment of the present invention provides a user equipment, including:
  a distinguishing module, configured to distinguish uplink data to be sent, and obtain acknowledgement data of downlink transmission control protocol TCP service data and uplink TCP service data;
  a buffering module, configured to buffer the acknowledgement data of the downlink TCP service data in a first buffer, and buffer the uplink TCP service data in a second buffer; and
  a sending module, configured to send in priority the acknowledgement data of the downlink TCP service data in the first buffer.

It can be known from the foregoing technical solutions that, in the embodiments of the present invention, the uplink data is distinguished, the acknowledgement data of the downlink TCP service data and the uplink TCP service data are buffered separately, and the acknowledgement data is read and sent at an uplink sending moment in priority, which may ensure sending in priority of the acknowledgement data, and further ensures that there is no obvious change in a delay of a downlink TCP service relative to a delay of a single-downlink TCP service. Because there is no obvious change in the delay, and the delay is in direct proportion to a rate, there is no obvious change in a downlink transmission rate either, that is, a downlink peak rate during a single-service may still be reached when services are concurrent.

DESCRIPTION OF EMBODIMENTS

Figure 1:
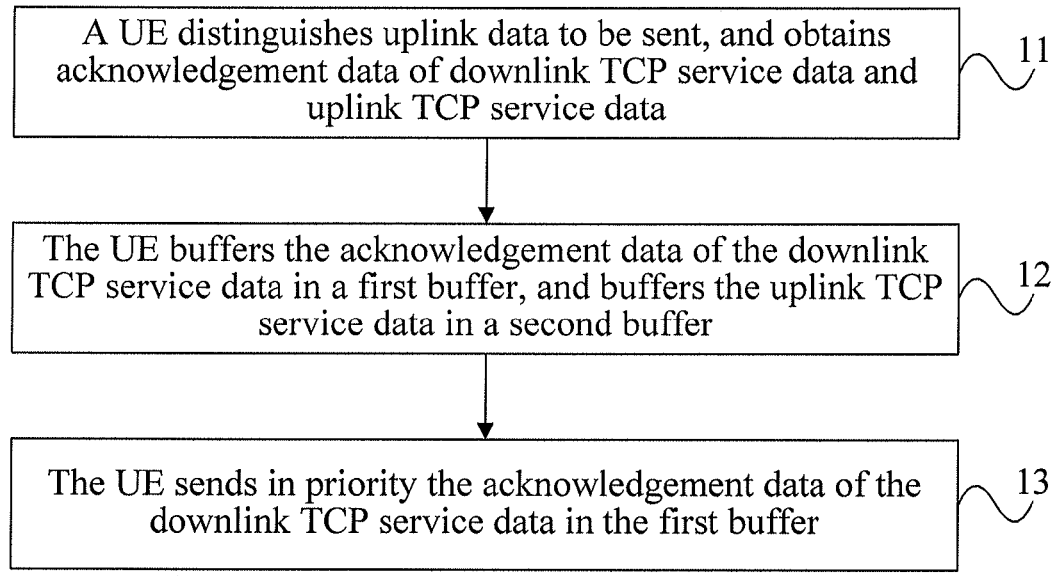
FIG. 1 is a schematic flow chart of an embodiment of an uplink data sending method according to the present invention.

FIG. 1 is a schematic flow chart of an embodiment of an uplink data sending method according to the present invention, where the method includes:

Step 11: A user equipment (User Equipment, UE) distinguishes uplink data to be sent, and obtains acknowledgement data of downlink TCP service data and uplink TCP service data.

When TCP uplink and downlink services are concurrent, the uplink data that the UE needs to send to a base station (eNB) not only includes the uplink TCP service data (which is equivalent to uplink data in a case of single-TCP uplink), but also includes the acknowledgement data of the downlink TCP service data (which is equivalent to downlink data in the case of single-TCP downlink).

In the embodiment of the present invention, the uplink TCP service data is represented by DATA, and the acknowledgement data of the downlink TCP service data is represented by ACK, where the acknowledgement data includes negative acknowledgement and positive acknowledgement.

In the prior art, when TCP services are concurrent, the uplink data is basically sent according to a sequence of DATA, ACK, DATA, ACK . . . Because the DATA hinders the ACK from sending, a delay of a downlink service is increased, and a transmission rate of the downlink data is reduced.

The DATA and the ACK are distinguished in the embodiment of the present invention, so as to ensure sending in priority of the ACK.

Step 12: The UE buffers the acknowledgement data of the downlink TCP service data in a first buffer, and buffers the uplink TCP service data in a second buffer.

As described above, because the DATA and the ACK have a same priority in the prior art, the DATA and the ACK are buffered basically in an interleaved manner during buffering.

In the embodiment of the present invention, the DATA and the ACK are distinguished separately and buffered during buffering.

Step 13: The UE sends in priority the acknowledgement data of the downlink TCP service data in the first buffer.

In the embodiment of the present invention, because the DATA and the ACK are buffered separately, the data (that is, the ACK) in the first buffer may be read in priority during sending, or even there is no ACK data, a bandwidth is reserved for the ACK data so that the ACK may be sent in time after being received subsequently. In this way, sending in priority of the ACK may be ensured.

In this embodiment, the uplink data is distinguished, the acknowledgement data of the downlink TCP service data and the uplink TCP service data are buffered separately, and the acknowledgement data is read and sent at an uplink sending moment in priority, which may ensure sending in priority of the acknowledgement data, and further ensures that there is no obvious change in a delay of a downlink TCP service relative to a delay of a single-downlink TCP service. Because there is no obvious change in the delay, and the delay is in direct proportion to a rate, there is no obvious change in a downlink transmission rate either, that is, a downlink peak rate during a single-service may still be reached when services are concurrent.

Figure 2:
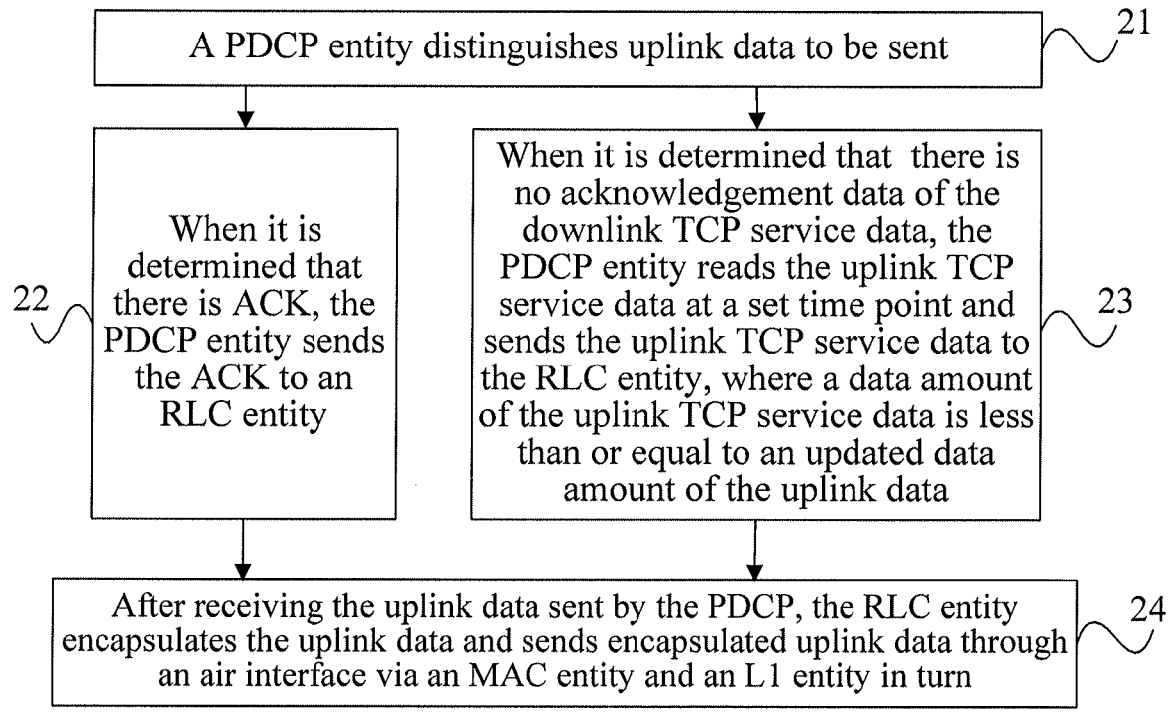
FIG. 2 is a schematic flow chart of another embodiment of an uplink data sending method according to the present invention.
Figure 3:
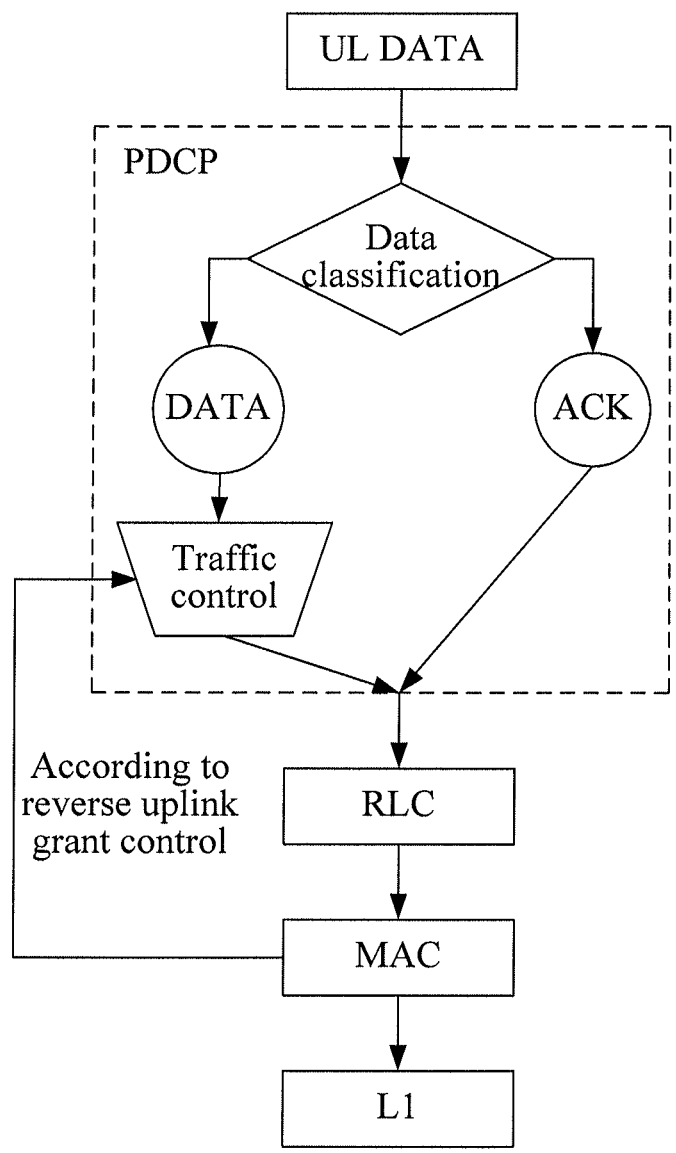
FIG. 3 is a schematic structural diagram corresponding to FIG. 2.

FIG. 2 is a schematic flow chart of another embodiment of an uplink data sending method according to the present invention, and FIG. 3 is a schematic structural diagram corresponding to FIG. 2. In this embodiment, a manner of reserving a bandwidth is adopted to ensure sending in priority of ACK. This embodiment includes:

Step 21: A packet data convergence protocol (Packet Data Convergence Protocol, PDCP) entity distinguishes uplink data (Uplink data, UL DATA) to be sent, buffers ACK in a first buffer, and buffers DATA in a second buffer.

Step 22: When it is determined that there is acknowledgement data (ACK) of downlink TCP service data, the PDCP entity sends the ACK to a radio link control (Radio Link Control, RLC) entity.

That is to say, after receiving the ACK, the PDCP entity does not make the ACK queue with the DATA, but directly sends the ACK to the RLC entity in real time.

Step 23: When it is determined that there is no acknowledgement data of the downlink TCP service data, the PDCP entity reads the uplink TCP service data at a set time point and sends the uplink TCP service data to the RLC entity, where a data amount of the uplink TCP service data is less than or equal to an updated data amount of the uplink data.

An eNB may send an uplink grant to a UE, where the uplink grant may include information such as TBSize (a size of a transmission block) used to indicate an amount of data that the UE may send to the eNB, and information used to indicate whether the data is new data or retransmission data.

The UE may add TBSize in new grants received in a period, and uses a sum of the TBSize in the new grants as a data amount of uplink data that may be sent in a next period. A new grant refers to an uplink grant including information indicating the data that the UE may send to the eNB is new data. Assuming that a period is T (millisecond), and a sum of TBSize included in all new grants received by the UE in a period of nT is UINewGrantSize, a data amount of new data that the UE may send to the eNB in a $(n+1)^{th}$ period is UINewGrantSize That is to say, assuming that a data amount of uplink data that may be sent in a current period is represented by pdcpsendsize, the pdcpsendsize is equal to UINewGrantSize obtained according to uplink grants of a previous period.

The amount of data that may be sent in the current period is obtained according to the uplink grants of the previous period, and may be referred to as reverse uplink grant control.

Because the ACK is sent in real time, assuming that a sending amount of the ACK is represented by tcpacksize, pdcpsendsize needs to be updated after the ACK is sent, and the updated pdcpsendsize is a value obtained by subtracting the tcpacksize from the pdcpsendsize that is before updating, which may be represented as the updated data amount (pdcpsendsize')=the data amount before updating (pdcpsendsize)−the amount of sent data (tcpacksize).

In order to implement bandwidth reservation of the ACK, when the DATA is sent, not all the remaining data amount can be used, and part of the remaining data amount needs to be kept so as to ensure sending of subsequent ACK. For example, if the remaining data amount is pdcpsendsize' after all ACK is sent, an amount of the sent DATA needs to be less than pdcpsendsize' when the DATA is sent.

Optionally, the PDCP entity may read the uplink TCP service data at T/2 and T moments, and a data amount of the read uplink TCP service data is equal to half of the updated data amount. That is, if there is no ACK at the T/2 or T moments, the DATA may be sent, and an data amount of the sent DATA=pdcpsendsize'/2. Assuming that the DATA of the foregoing data amount is sent at T/2. pdcpsendsize'/2 of ACK may still be sent in a subsequent T/2−T time segment, which implements bandwidth reservation of the ACK data, and in this way, an ACK blocking problem caused by that if the DATA uses all data amounts, the ACK cannot be sent anymore at a current period may be avoided.

Step 24: After receiving the uplink data sent by the PDCP, the RLC entity encapsulates the uplink data and sends encapsulated uplink data through an air interface via a media access control (Media Access Control, MAC) entity and a physical layer (L1) entity in turn.

The RLC entity may encapsulate the ACK or the DATA sent by the PDCP entity, obtains an RLC PDU and sends the RLC PDU to the MAC entity.

The MAC entity encapsulates the RLC PDU, obtains an MAC PDU and sends the MAC PDU to the L1 entity.

The L1 entity sends the received MAC PDU to the eNB through the air interface.

In this embodiment, the manner of reserving a bandwidth for ACK ensures sending in priority of ACK, thereby ensuring that there is no obvious increase in a delay of a downlink TCP service relative to a delay of a single-downlink TCP service, greatly improving a peak rate of the downlink TCP service when services are concurrent, and implementing full use of downlink air interface resources.

Figure 4:
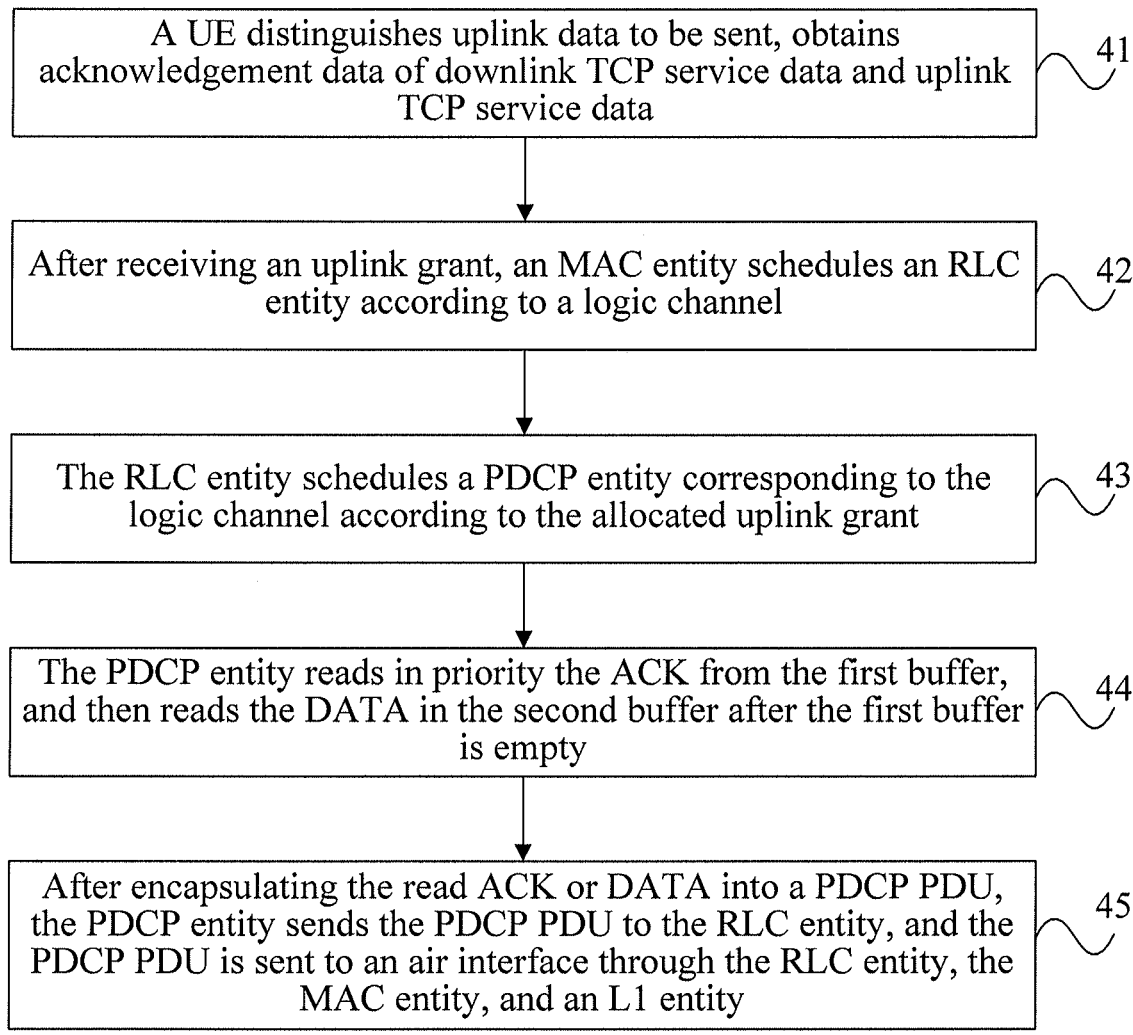
FIG. 4 is a schematic flow chart of another embodiment of an uplink data sending method according to the present invention.
Figure 5:
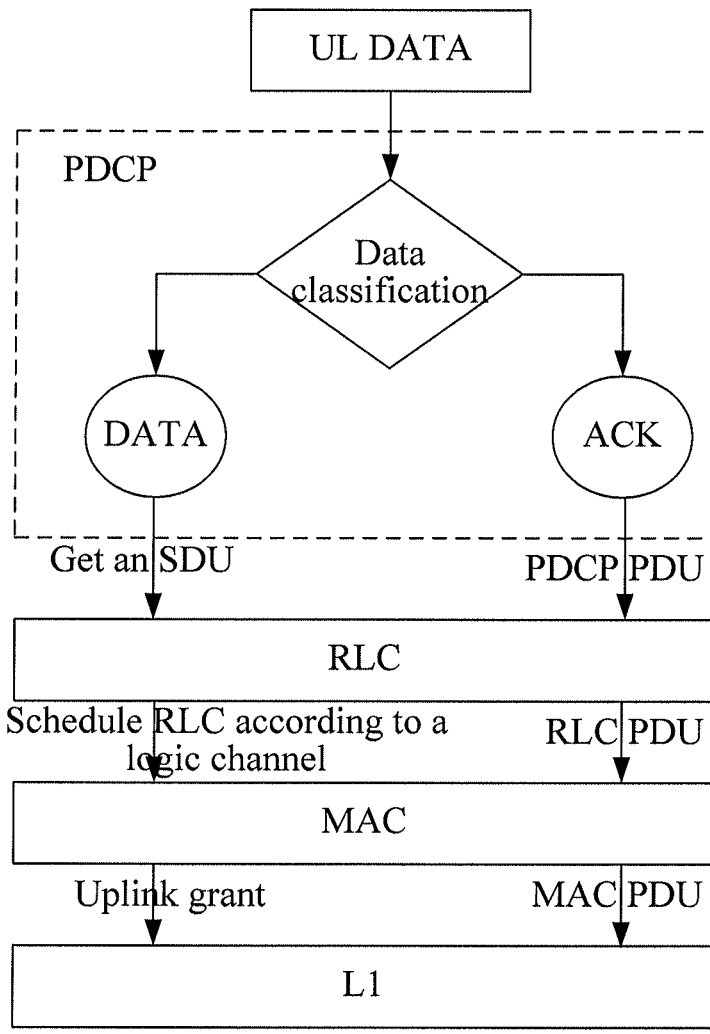
FIG. 5 is a schematic structural diagram corresponding to FIG. 4.

FIG. 4 is a schematic flow chart of another embodiment of an uplink data sending method according to the present invention, and FIG. 5 is a schematic structural diagram corresponding to FIG. 4. In this embodiment, a manner of reserving a bandwidth is adopted to ensure sending in priority of ACK. This embodiment includes:

Step 41: A UE (which may specifically be a PDCP entity) distinguishes uplink data (Uplink data, UL DATA) to be sent, obtains acknowledgement data of downlink TCP service data and uplink TCP service data, buffers the acknowledgement data (ACK) of the downlink TCP service data in a first buffer, and buffers the uplink TCP service data (DATA) in a second buffer.

Step 42: After receiving an uplink grant, an MAC entity schedules an RLC entity according to a logic channel.

Step 43: The RLC entity schedules a PDCP entity corresponding to the logic channel according to the allocated uplink grant.

Step 44: The PDCP entity reads in priority the ACK from the first buffer, and then reads the DATA in the second buffer after the first buffer is empty.

Step 45: After encapsulating the read ACK or DATA into a PDCP PDU, the PDCP entity sends the PDCP PDU to the RLC entity, and the PDCP PDU is sent to an air interface through the RLC entity, the MAC entity, and an L1 entity.

The PDCP entity may use the read ACK or DATA as a PDCP service data unit (Service Data Unit, SDU), then add a PDCP sequence number (Sequence Number, SN) to the PDCP SDU to generate a PDCP protocol data unit (Protocol Data Unit, PDU), and send the PDCP PDU to the RLC entity.

The RLC entity encapsulates the PDCP PDU, obtains an RLC PDU and sends the RLC PDU to the MAC entity.

The MAC entity encapsulates the RLC PDU, obtains an MAC PDU and sends the MAC PDU to the L1 entity.

The L1 entity sends the received MAC PDU to an eNB through the air interface.

In this embodiment, the ACK is scheduled in priority during data scheduling to ensure sending in priority of the ACK, thereby ensuring that there is no obvious increase in a delay of a downlink TCP service relative to a delay of a single-downlink TCP service, greatly improving a peak rate of the downlink TCP service when services are concurrent, and implementing full use of downlink air interface resources.

Figure 6:
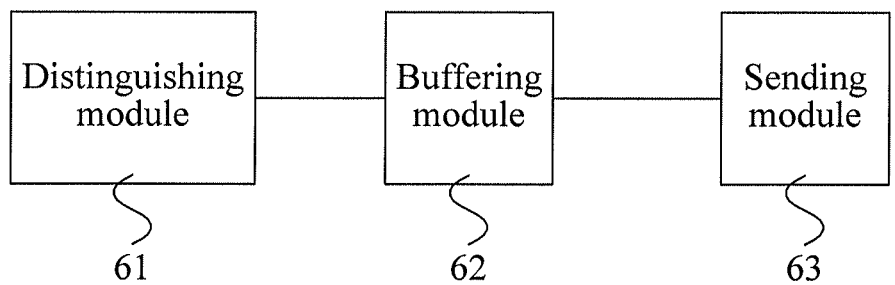
FIG. 6 is a schematic structural diagram of an embodiment of a user equipment according to the present invention.

FIG. 6 is a schematic structural diagram of an embodiment of a user equipment according to the present invention, where the user equipment includes a distinguishing module 61, a buffering module 62, and a sending module 63. The distinguishing module 61 is configured to distinguish uplink data to be sent, and obtain acknowledgement data of downlink TCP service data and uplink TCP service data; the buffering module 62 is configured to buffer the acknowledgement data of the downlink TCP service data in a first buffer, and buffer the uplink TCP service data in a second buffer; and the sending module 63 is configured to send in priority the acknowledgement data of the downlink TCP service data in the first buffer.

Optionally, the sending module is specifically configured to: send in priority the acknowledgement data of the downlink TCP service data in a manner of reserving a bandwidth for the acknowledgement data of the downlink TCP service data; or send in priority the acknowledgement data of the downlink TCP service data in a manner of reading the first buffer in priority.

Figure 7:
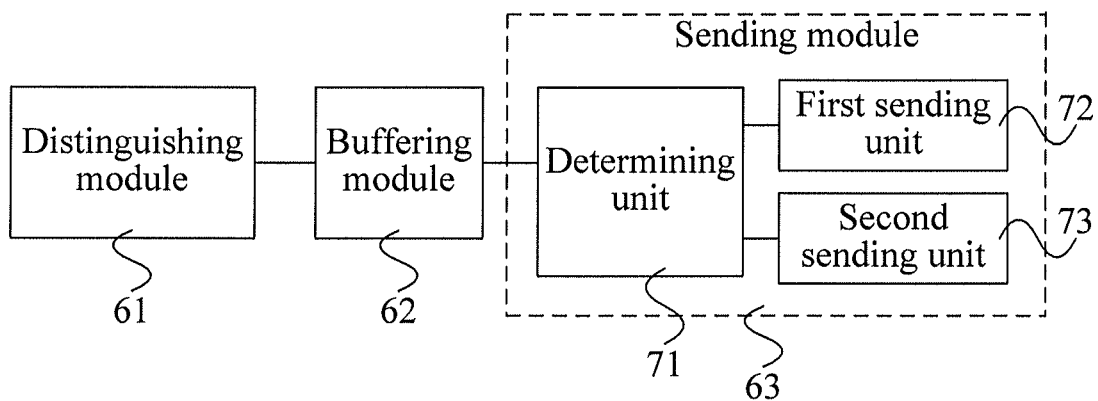
FIG. 7 is a schematic structural diagram of another embodiment of a user equipment according to the present invention.

Optionally, referring to FIG. 7, the sending module 63 may include a determining unit 71, a first sending unit 72, and a second sending unit 73. The determining unit 71 is configured to determine a data amount of uplink data that can be sent and whether there is the acknowledgement data of the downlink TCP service data; the first sending unit 72 is configured to: when it is determined that there is the acknowledgement data of the downlink TCP service data, send the acknowledgement data of the downlink TCP service data to an RLC entity, and update the data amount; and the second sending unit 73 is configured to: when it is determined that there is no acknowledgement data of the downlink TCP service data, read the uplink TCP service data at a set time point and send the uplink TCP service data to the RLC entity, where a data amount of the read uplink TCP service data is less than or equal to an updated data amount of the uplink data.

Optionally, the second sending unit 73 is specifically configured to read the uplink TCP service data at T/2 and T moments, where a data amount of the read uplink TCP service data is equal to half of the updated data amount of the uplink data, and T is a period.

Figure 8:
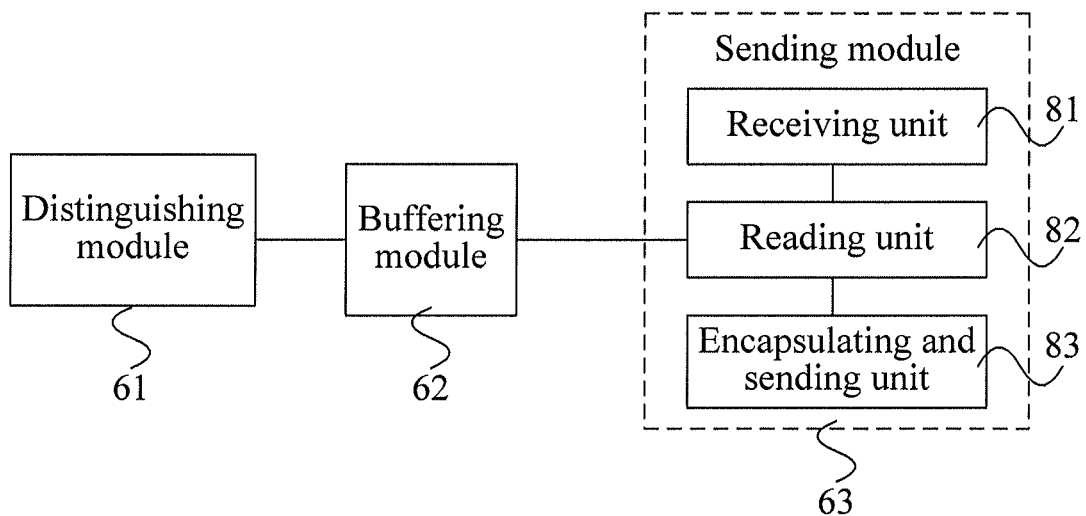
FIG. 8 is a schematic structural diagram of another embodiment of a user equipment according to the present invention.

Optionally, referring to FIG. 8, the sending module 63 may include a receiving unit 81, a reading unit 82, and an encapsulating and sending unit 83. The receiving unit 81 is configured to receive a message which is used to schedule data and sent by the RLC entity; the reading unit 82 is configured to read in priority the acknowledgement data of the downlink TCP service data in the first buffer, and then read the uplink TCP service data in the second buffer after the first buffer is empty; and the encapsulating and sending unit 83 is configured to encapsulate the uplink TCP service data in the second buffer and send encapsulated data to the RLC entity.

In this embodiment, the uplink data is distinguished, the acknowledgement data of the downlink TCP service data and the uplink TCP service data are buffered separately, and the acknowledgement data is read and sent at an uplink sending moment in priority, which may ensure sending in priority of the acknowledgement data, and further ensures that there is no obvious change in a delay of a downlink TCP service relative to a delay of a single-downlink TCP service. Because there is no obvious change in the delay, and the delay is in direct proportion to a rate, there is no obvious change in a downlink transmission rate either, that is, a downlink peak rate during a single-service may still be reached when services are concurrent.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent substitutions to part or all of the technical features of the technical solutions described in the foregoing embodiments; however these modifications or substitutions do not make the essence of the corresponding technical solutions depart from the scope of the technical solutions of the embodiments of the present invention.

What is claimed is:

1. An uplink data sending method, comprising:
   distinguishing uplink data to be sent, and
   obtaining acknowledgement data of downlink transmission control protocol TCP service data and uplink TCP service data;
   buffering the acknowledgement data of the downlink TCP service data in a first buffer, and buffering the uplink TCP service data in a second buffer; and
   sending in higher priority, the acknowledgement data of the downlink TCP service data in the first buffer in a manner of reserving bandwidth for the acknowledgement data of the downlink TCP service data, wherein the reserving of the bandwidth comprising:
   determining by a packet data convergence protocol PDCP entity, a data amount of uplink data that can be sent and whether there is the acknowledgement data of the downlink TCP service data;
   when it is determined that there is the acknowledgement data of the downlink TCP service data, sending by the PDCP entity, the acknowledgement data of the downlink TCP service data to a radio link control RLC entity, and updating the data amount to obtain an updated data amount of the uplink data that can be sent; and
   when it is determined that there is no acknowledgement data of the downlink TCP service data, reading by the PDCP entity, the uplink TCP service data at a set time point and sending the uplink TCP service data to the RLC entity, wherein the data amount of the uplink TCP service data is less than or equal to the updated data amount of the uplink data.

2. The method according to claim 1, wherein the sending in higher priority, the acknowledgement data of the downlink TCP service data in the first buffer, comprises:
   sending in higher priority, the acknowledgement data of the downlink TCP service data in a manner of reading the first buffer in priority.

3. The method according to claim 2, wherein the sending in higher priority the acknowledgement data of the downlink TCP service data in a manner of reading the first buffer in priority comprises:
   when receiving a message which is used to schedule data and sent by an RLC entity, reading in priority, by a PDCP entity, the acknowledgement data of the downlink TCP service data in the first buffer, then reading the uplink TCP service data in the second buffer after the first buffer is empty, encapsulating the uplink TCP service data in the second buffer and sending encapsulated data to the RLC entity.

4. The method according to claim 1, wherein the reading the uplink TCP service data at a set time point and sending the uplink TCP service data to the RLC entity, wherein the data amount of the uplink TCP service data is less than or equal to the updated data amount of the uplink data comprises:
   reading the uplink TCP service data at T/2 and T moments, wherein the data amount of the uplink TCP service data is equal to half of the updated data amount of the uplink data, and T is a period.

5. A user equipment, comprising at least one processor executing program codes stored in a non-transitory computer readable storage medium, wherein the at least one processor is configured to:
   distinguish uplink data to be sent, and obtain acknowledgement data of downlink transmission control protocol TCP service data and uplink TCP service data;
   buffer the acknowledgement data of the downlink TCP service data in a first buffer, and buffer the uplink TCP service data in a second buffer; and
   send in higher priority, the acknowledgement data of the downlink TCP service data in the first buffer in a manner of reserving bandwidth for the acknowledgement data of the downlink TCP service data, wherein the reserving of the bandwidth comprising:
   determining by a packet data convergence protocol PDCP entity, a data amount of uplink data that can be sent and whether there is the acknowledgement data of the downlink TCP service data;
   when it is determined that there is the acknowledgement data of the downlink TCP service data, sending by the PDCP entity, the acknowledgement data of the downlink TCP service data to a radio link control RLC entity, and updating the data amount to obtain an updated data amount of the uplink data that can be sent; and
   when it is determined that there is no acknowledgement data of the downlink TCP service data, reading by the PDCP entity, the uplink TCP service data at a set time point and sending the uplink TCP service data to the RLC entity, wherein the data amount of the uplink TCP service data is less than or equal to the updated data amount of the uplink data.

6. The equipment according to claim 5, wherein the at least one processor is configured to:
   send in higher priority, the acknowledgement data of the downlink TCP service data in a manner of reading the first buffer in priority.

7. The equipment according to claim 6, wherein the at least one processor is configured to
   receive a message which is used to schedule data and sent by an RLC entity;
   read in higher priority the acknowledgement data of the downlink TCP service data in the first buffer, and then read the uplink TCP service data in the second buffer after the first buffer is empty; and
   encapsulate the uplink TCP service data in the second buffer and send encapsulated data to the RLC entity.

8. The equipment according to claim 5, wherein the at least one processor is configured to:
   read the uplink TCP service data at T/2 and T moments, wherein the data amount of the uplink TCP service data is equal to half of the updated data amount of the uplink data, and T is a period.

* * * * *